United States Patent

Shimasaki et al.

[11] Patent Number: 6,112,519
[45] Date of Patent: Sep. 5, 2000

[54] EXHAUST GAS PURIFICATION DEVICE FOR AN INTERNAL COMBUSTION ENGINE

[75] Inventors: Yuichi Shimasaki; Hironao Fukuchi; Hiroaki Kato; Kazutomo Sawamura, all of Saitama; Yasushi Kato, Nagoya, all of Japan

[73] Assignees: Honda Giken Kogyo Kabushiki Kaisha, Tokyo; NGK Insulators, Ltd., Nagoya, both of Japan

[21] Appl. No.: 09/265,393

[22] Filed: Mar. 10, 1999

[30] Foreign Application Priority Data

Mar. 12, 1998 [JP] Japan .................................. 10-061401

[51] Int. Cl.[7] ...................................................... F01N 3/10
[52] U.S. Cl. .................................. 60/300; 60/311; 60/303; 55/DIG. 30; 422/197
[58] Field of Search .............................. 60/303, 300, 311; 55/DIG. 30; 422/169, 197

[56] References Cited

U.S. PATENT DOCUMENTS

| | | | |
|---|---|---|---|
| 4,419,113 | 12/1983 | Smith | 55/484 |
| 4,535,589 | 8/1985 | Yoshida et al. | 60/303 |
| 4,934,142 | 6/1990 | Hayashi et al. | 60/297 |
| 5,634,331 | 6/1997 | Aoki et al. | 60/284 |
| 5,678,403 | 10/1997 | Kanehara et al. | 60/309 |
| 5,839,273 | 11/1998 | Maus | 60/274 |

FOREIGN PATENT DOCUMENTS

| | | |
|---|---|---|
| 8-218856 | 8/1996 | Japan . |
| 09068032 | 11/1997 | Japan . |

OTHER PUBLICATIONS

European Search Report dated 12/9/99.

*Primary Examiner*—Thomas Denion
*Assistant Examiner*—Binh Tran
*Attorney, Agent, or Firm*—Armstrong, Westerman, Hattori, McLeland & Naughton

[57] ABSTRACT

A foreign matter-removing filter is provided upstream of an electrically-heated heater.

8 Claims, 4 Drawing Sheets

EXHAUST GAS PURIFICATION DEVICE FOR AN INTERNAL COMBUSTION ENGINE

BACKGROUND OF THE INVENTION

1. Field of the Invention

This invention relates to a device for purifying exhaust gas from an internal combustion engine.

The present application is based on Japanese Patent Application No. Hei. 10-61401, which is incorporated herein by reference.

2. Description of the Related Art

Nitrogen oxides, carbon monoxide and hydrocarbons are contained in exhaust gas discharged from an internal combustion engine mounted on a vehicle such as an automobile, and after these are purified through the oxidation-reduction effected by a three-way catalyst, the exhaust gas is discharged to the atmosphere. Precious metal, such as platinum (Pt), rhodium (Rh) and palladium (Pd), is used in this three-way catalyst, and performs an efficient exhaust gas purification effect in a high-temperature, activated condition of not less than about 350° C. Namely, in a cold condition of the engine as when starting the engine in a low-temperature condition, the exhaust gas purification effect, achieved by the catalytic converter, is extremely aggravated. Therefore, the temperature of the catalytic converter needs to be rapidly raised to a predetermined temperature so that the converter can be brought into a high-temperature, activated condition. Therefore, there is known an electrically heated-type heater (called "electrically-heated catalyst" (EHC) unit) in which the electrically heated-type heater is provided upstream of a catalyst converter unit so as to heat exhaust gas.

FIG. 1 shows one example of an exhaust gas purification device incorporating an electrically heated-type heater. In the sequence from a downstream to an upstream side with respect to the direction of flow of exhaust gas, an exhaust pipe 101, main catalytic converter units 102 and an auxiliary catalytic converter unit 103 (these converter units 102 and 103 jointly constitute an exhaust gas purification catalytic converter) are arranged in this order. Further, an EHC unit 104, containing the electrically heated-type heater, is provided immediately upstream of the auxiliary catalytic converter unit 103. In the catalytic converter of this construction, when an internal combustion engine is in a cold condition as at the time immediately after starting the engine, a switch SW is operated to apply a battery voltage VB to the EHC unit 104 to heat the same. As a result, the electrically heated-type heater of the EHC unit 104 is heated to promote the oxidation of unburned components of hydrocarbons in the exhaust gas, and this oxidation heat cooperates with the heat, generated by the electrically heated-type heater, to rapidly heat this electrically heated-type heater. As a result, the exhaust gas is heated, and also the auxiliary catalytic converter unit 103 of the next stage is heated, and further the main catalytic converter units 102 are heated, so that the whole of the catalytic converter is rapidly activated.

For example, Japanese Patent Publication No. Hei. 8-218856 discloses an electrically-heated catalyst (catalytic converter). A pair of electrodes are provided on a catalyst support comprising a honeycomb structural body having exhaust flow passages, and a plurality of slits are formed in the catalyst support so that the catalyst support, when electrically heated, can be heated uniformly over an entire area thereof, and in this construction, thermal stresses, developing at ends of the slits, are relieved.

FIG. 2 shows one specific construction of the EHC unit 104. In this case, an electrically heated-type heater comprises a flat, cross-sectionally circular honeycomb structural body 1 having exhaust flow passages, and this heater itself is heated by resistance heat upon application of an electric current. The honeycomb structural body 1 may be provided in the form of a monolith catalyst, in which case the three-way catalyst is dispersed and deposited on the surface of the catalyst support (honeycomb structural body). This honeycomb structural body 1 is received within a housing 3 of metal, and is retained there in an insulated manner by retaining means (not shown). A pair of electrodes 2 and 2' extend through a peripheral wall of the housing 3, and supply electric power to the honeycomb structural body 1 from the exterior. If the electrodes 2 and 2' are connected respectively to diametrically-opposite portions of the honeycomb structural body 1 of a circular cross-section, a large proportion of the electric current flows along the shortest path interconnecting the electrodes 2 and 2. Namely, the value of the current varies from one portion to another of the honeycomb structural body 1, so that the temperature distribution due to the heating becomes non-uniform. In order to overcome this problem, the honeycomb structural body 1 has a plurality of slits 4 parallel to one another. With this construction, the electric current flows between the electrodes 2 and 2' along a zigzag path formed as a result of the formation of the slits 4, and therefore the concentration of the electric current is avoided, and the honeycomb structural body 1 is heated uniformly over the entire area thereof.

As is well known, exhaust gas from an internal combustion engine contains pyrolytic high molecular substances and free carbons due to engine oil, and abrasion powder resulting from a cylinder wall and a piston ring. Larger ones among these foreign matters in the exhaust gas may physically damage the EHC unit 104 upon impingement thereon. Even smaller or fine foreign matters adhere to and deposit on the honeycomb structural body 1 and electrodes 2 and 2' of the EHC unit 104 which are disposed in the exhaust passage, and are exposed directly to a stream of exhaust gas. The foreign matters, deposited on the honeycomb structural body 1, cause the clogging of the exhaust flow passages, and adversely affect the exhaust gas purification properties. Particularly when electrically-conductive foreign matters adhere to the EHC unit 104, firstly, the slits 4, formed in the honeycomb structural body 1, are short-circuited, so that the proper zigzag current path cannot be maintained, thereby preventing the honeycomb structural body 1 from being heated uniformly over the entire area thereof. Secondly, the ability of insulation between the electrodes 2 and 2' and the metal housing 3, as well as the ability of insulation between the honeycomb structural body 1 and the metal housing 3, is lowered, so that the predetermined voltage cannot be applied to the honeycomb structural body 1. These all adversely affect the exhaust gas purification effect achieved by the catalytic converter.

SUMMARY OF THE INVENTION

It is therefore an object of this invention to provide an exhaust gas purification device having a mechanism for preventing foreign matters in exhaust gas from reaching the components of the EHC unit, thereby preventing the deterioration of the exhaust gas purification properties.

According to the present invention, there is provided an exhaust gas purification device comprising a catalytic converter provided in an exhaust system of an internal combustion engine, and an electrically heated-type heater disposed upstream of the catalytic converter. Further, a foreign matter-removing filter is provided upstream of the electrically heated-type heater. With this construction, foreign matters in exhaust gas are prevented from reaching components of the EHC unit, thereby preventing the deterioration of the exhaust gas purification properties.

In the exhaust gas purification device of the present invention, the foreign matter-removing filter is disposed immediately upstream of a cross-sectional area-increasing region of an exhaust passage containing the electrically heated-type heater. With this construction, the size of the foreign matter-removing filter can be reduced, and this is desirable. And besides, since the foreign matter-removing filter is disposed as remotely from the combustion chamber as possible, adverse effects due to the high-temperature exhaust gas are reduced, and the range of choice of the material is increased.

In the exhaust gas purification device of the present invention, flow rate limitation means is provided on the foreign matter-removing filter such that the rate of flow of exhaust gas through the foreign matter-removing filter is lower at a peripheral edge portion of the foreign matter-removing filter than at a central portion thereof. With this construction, foreign matters are prevented from depositing on the peripheral edge portion of the honeycomb structural body of the EHC unit and those portions of the structural member to which the electrodes are connected, respectively.

Features and advantages of the invention will be evident from the following detailed description of the preferred embodiments described in conjunction with attached drawings.

DETAILED DESCRIPTION OF THE PREFERRED EMBODIMENTS

Figure 1:
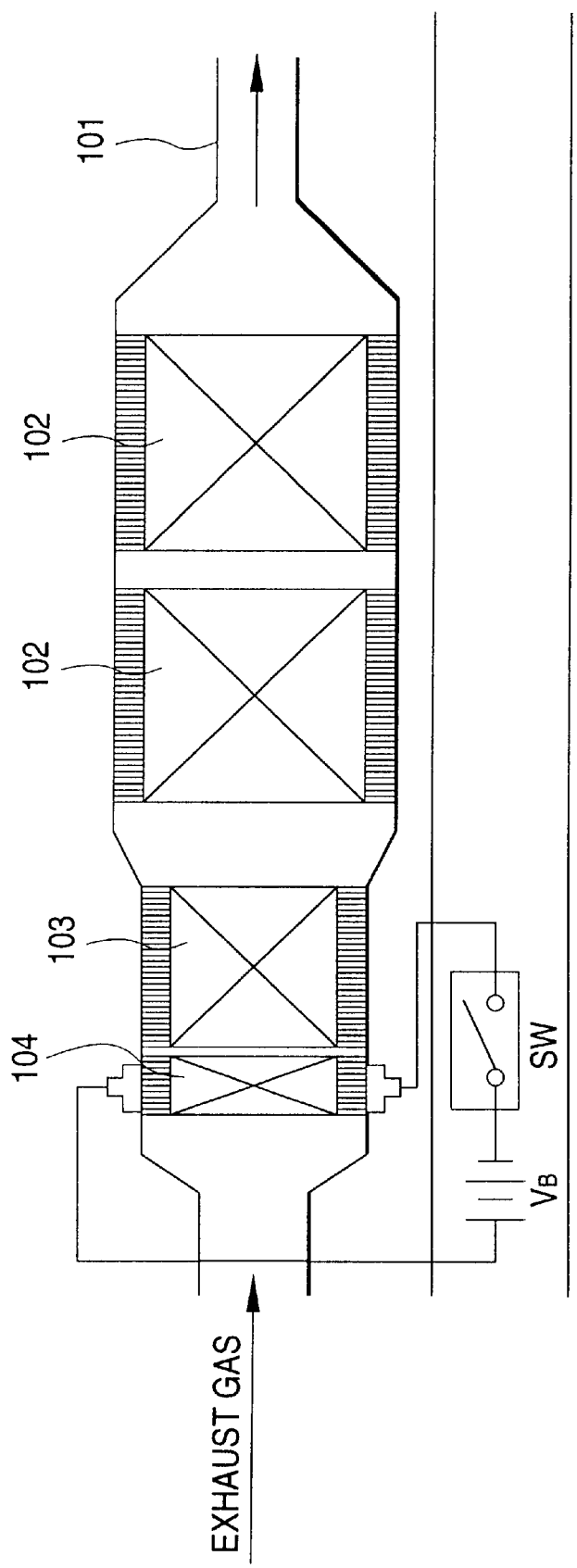
FIG. 1 is a cross-sectional view of a catalytic converter provided in an exhaust system of an internal combustion engine.
Figure 2:
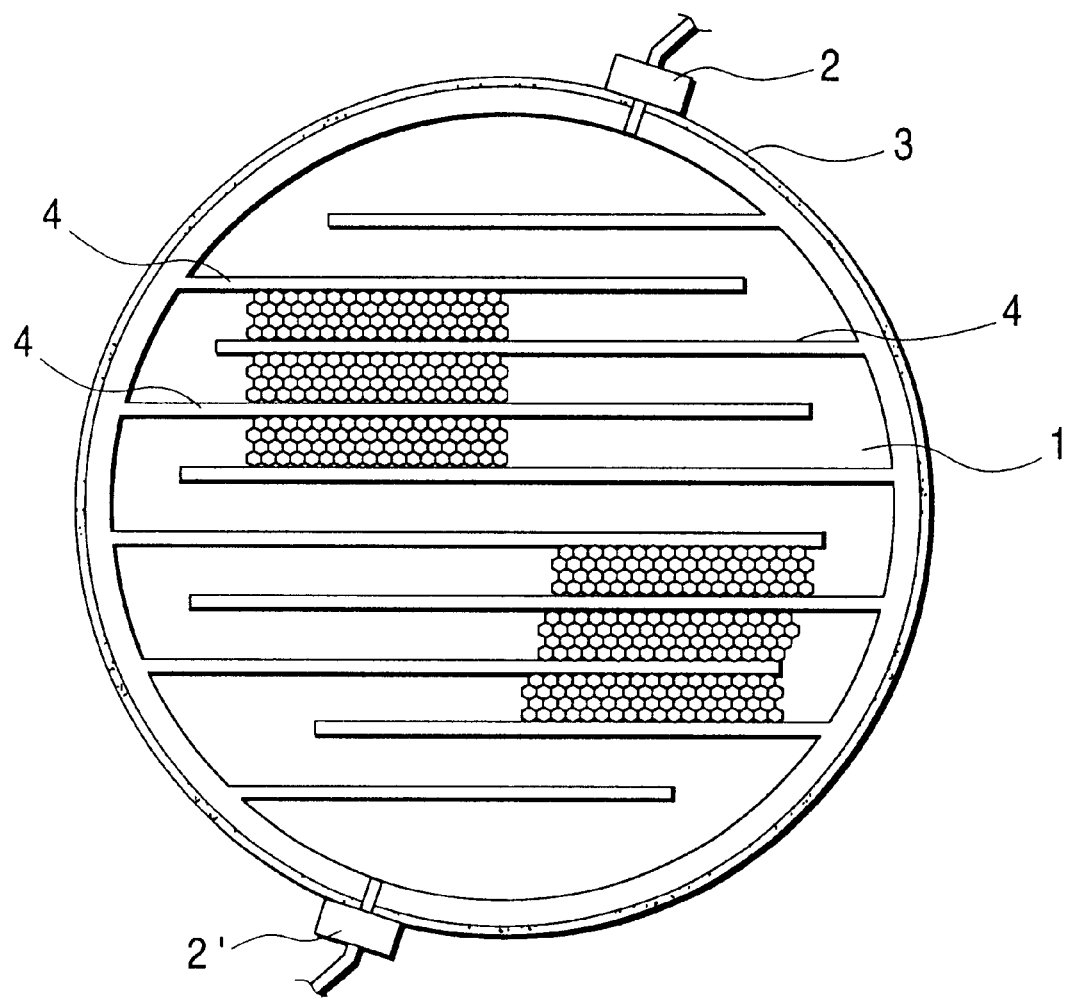
FIG. 2 is a cross-sectional view of one example of an EHC unit incorporated in the catalytic converter of FIG. 1.
Figure 3:
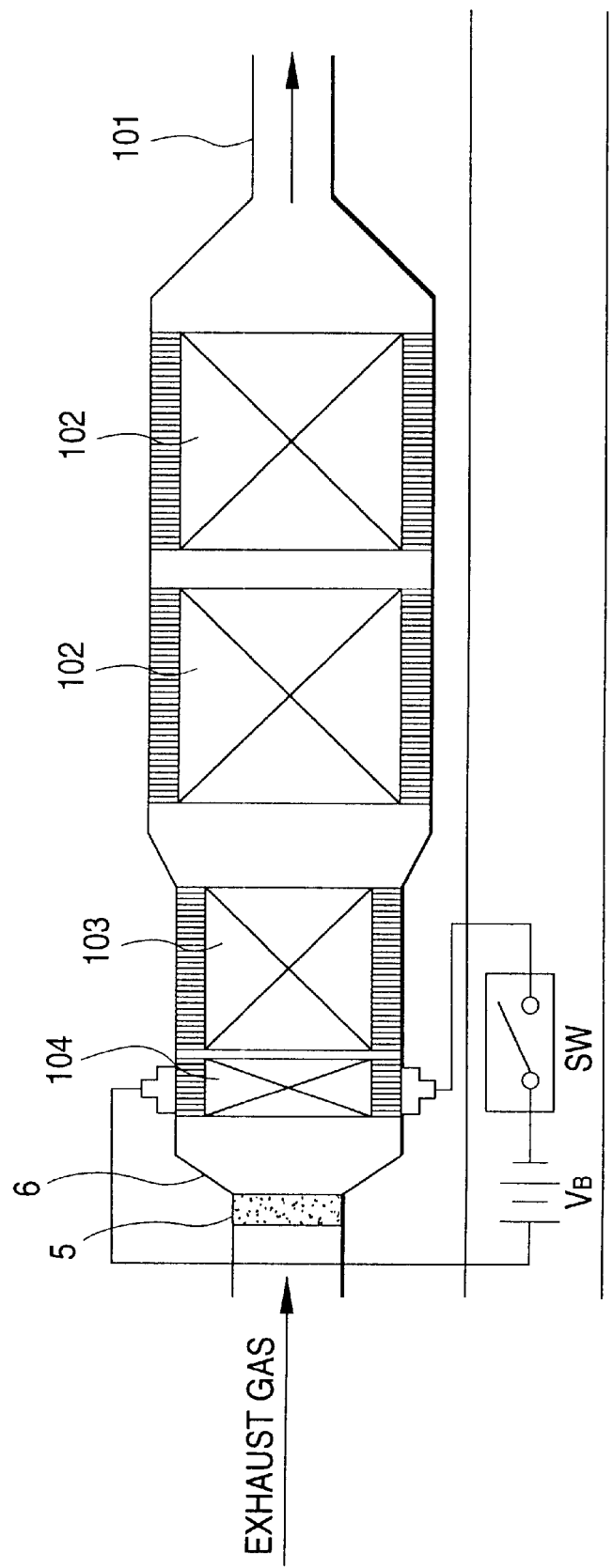
FIG. 3 is cross-sectional view of a catalytic converter of the present invention.

Although a catalytic converter and an EHC unit 104 of an exhaust gas purifying device of the present invention, shown in FIG. 3, are similar in construction respectively to those of the device shown in FIGS. 1 and 2, the former device differs from the latter device in that a foreign matter-removing filter 5 is provided upstream of the EHC unit 104. Thanks to the provision of the foreign matter-removing filter 5, foreign matters are prevented from adhering to or impinging on the EHC unit 104. Namely, the foreign matter-removing filter 5 is provided upstream of an electrically heated-type heater. With this construction, foreign matters in exhaust gas are prevented from reaching components of the EHC unit 104, thereby preventing the deterioration of the exhaust gas purification properties. When the foreign matter-removing filter 5 is exposed to the high-temperature exhaust gas, the deterioration of this filter 5 is promoted, and therefore it is preferred that the filter 5, provided in an exhaust passage, should be disposed as close to the EHC unit 104 as possible, and hence should be disposed as remotely from an exhaust port in a cylinder head, having a combustion chamber of an internal combustion engine, as possible. In order to enhance the exhaust gas purification effect achieved by a catalytic operation, that portion of the exhaust passage, disposed upstream of the catalytic converter, is increasing in cross-sectional area toward the downstream side. More specifically, there is provided a cone-shaped portion 6 which is an upstream portion of a cross-sectional area-increasing region of the exhaust passage which is disposed upstream of the EHC unit 104, and is increasing in cross-sectional area in the downstream direction. Preferably, the foreign matter-removing filter 5 is provided immediately upstream of the cone-shaped portion 6, that is, at a downstream end of a portion of the exhaust passage disposed between the exhaust port of the cylinder head and the cross-sectional area-increasing region of the exhaust passage containing the electrically heated-type heater. Namely, the foreign matter-removing filter 5 is disposed immediately upstream of the cross-sectional area-increasing region of the exhaust passage containing the electrically heated-type heater. With this construction, the size of the foreign matter-removing filter 5 can be reduced, and this is desirable. And besides, since the foreign matter-removing filter 5 is disposed as remotely from the combustion chamber as possible, adverse effects due to the high-temperature exhaust gas are reduced, and the range of choice of the material is increased.

Figure 4:
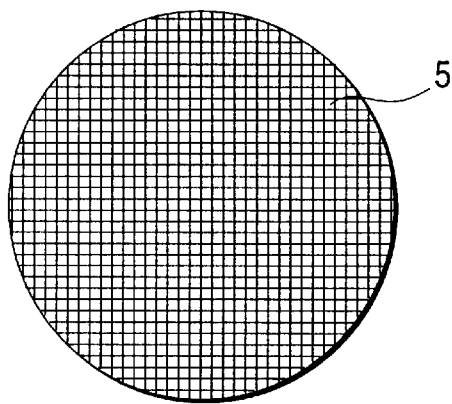
FIG. 4 is a cross-sectional view of a foreign matter-removing filter of the invention.

FIG. 4 shows an important portion of the foreign matter-removing filter incorporated in the exhaust gas purification device of the present invention. The foreign matter-removing filter 5 may be of any construction in so far as it has a group of fine passages forming flow passages for passing the exhaust gas therethrough, and the cross-sectional shape of the fine passages may be any suitable shape such as a lattice-shape, a polygonal shape and a fiber net-like shape. The group of fine passages may be formed by a porous material such as an inorganic ceramics material. If the cross-sectional area of each fine passage is reduced, that is, the density of the fine passages is made high, the fine passages allow only foreign matters of a small particle size to pass therethrough. However, if this density is too high, the flow resistance in the exhaust passage increases, and this is not desirable.

The flow of the exhaust gas is disturbed particularly at a peripheral edge portion of a honeycomb structural body 1 of the EHC unit 104 and those portions of the structural member 1 to which electrodes 2 and 2' are connected, respectively, and therefore the foreign matters are liable to deposit on these portions.

Figure 5:
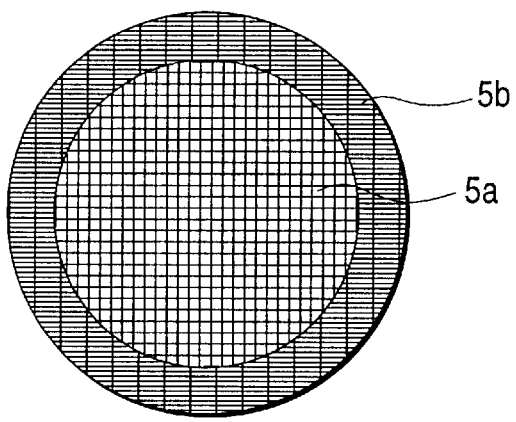
FIG. 5 is a cross-sectional view of a modified foreign matter-removing filter of the invention.

FIG. 5 shows a modified foreign matter-removing filter of the present invention. In this example, there is provided flow rate limitation means by which the rate of flow of the exhaust gas through the foreign matter-removing filter 5 is lower at a peripheral edge portion of a honeycomb structural body 1 than at a central portion thereof. With this construction, the exhaust gas is caused to flow through the central portion of the EHC unit 104 in a concentrated manner while reducing the flow of the exhaust gas through the peripheral edge portion. Specifically, the flow rate limitation means is achieved, for example, by a construction in which a filter 5a at the central portion is combined with a filter 5b of a smaller mesh size at the peripheral edge portion. Namely, the flow rate limitation means is provided on the foreign matter-removing filter 5 such that the flow rate of the exhaust gas is lower at the peripheral edge portion of the foreign matter-removing filter 5 than at the central portion thereof. With this construction, foreign matters are more effectively prevented from depositing on the peripheral edge portion of the honeycomb structural body 1 of the EHC unit 104 and those portions of the structural member 1 to which the electrodes 2 and 2' are connected, respectively.

Figure 6:
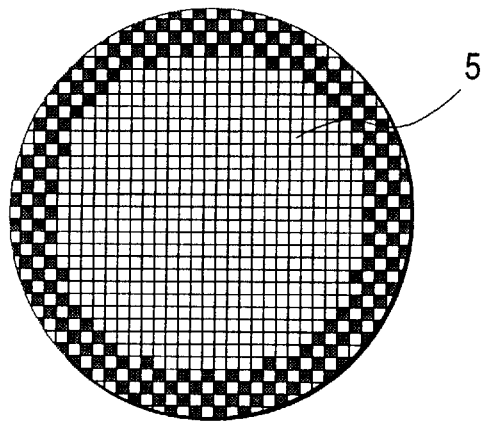
FIG. 6 is a cross-sectional view of another modified foreign matter-removing filter of the invention.

FIG. 6 shows another modified foreign matter-removing filter of the present invention. In this example, fine passages at a peripheral edge portion of the filter are closed in the ratio of 1 to a predetermined number. Namely, as in the filter of FIG. 5, flow rate limitation means is provided on the foreign matter-removing filter 5 such that the flow rate of the exhaust gas is lower at a peripheral edge portion of the foreign matter-removing filter 5 than at a central portion thereof. With this construction, foreign matters are more effectively prevented from depositing on the peripheral edge portion of the honeycomb structural body 1 of the EHC unit 104 and those portions of the structural member 1 to which the electrodes 2 and 2' are connected, respectively.

As described above, in the exhaust gas purification device of the present invention, the foreign matter-removing filter is provided upstream of the electrically heated-type heater, and therefore the deterioration of the exhaust gas purification properties due to the deposition of foreign matters, contained in the exhaust gas, on the catalytic converter is prevented.

And besides, in the present invention, the foreign matter-removing filter is disposed immediately upstream of the cross-sectional area-increasing region of the exhaust passage. With this construction, the size of the foreign matter-removing filter can be reduced, and this is desirable. And besides, since the foreign matter-removing filter is disposed as remotely from the combustion chamber as possible, adverse effects due to the high-temperature exhaust gas are reduced, and the range of choice of the material is increased.

Furthermore, in the present invention, the flow rate limitation means is provided on the foreign matter-removing filter such that the flow rate of the exhaust gas is lower at the peripheral edge portion of the foreign matter-removing filter than at the central portion thereof. With this construction, foreign matters are prevented from depositing on the peripheral edge portion of the honeycomb structural body of the EHC unit and those portions of the structural member to which the electrodes are connected, respectively.

Although the invention has been described in its preferred formed with a certain degree of particularity, it is understood that the present disclosure of the preferred form can be changed in the details of construction and in the combination and arrangement of parts without departing from the spirit and the scope of the invention as hereinafter claimed.

What is claimed is:

1. An exhaust gas purification device comprising:
   a catalytic converter provided in an exhaust system of an internal combustion engine;
   an electrically heated-type heater disposed upstream of said catalytic converter; and
   a foreign matter-removing filter being provided upstream of said electrically heated-type heater, said foreign matter-removing filter being constituted such that a mesh size at the peripheral edge portion thereof is smaller than a mesh size at the central portion thereof.

2. An exhaust gas purification device according to claim 1, wherein said foreign matter-removing filter is disposed immediately upstream of a cross-sectional area-increasing region of an exhaust passage containing said electrically heated-type heater.

3. An exhaust gas purification device according to claim 2, wherein said foreign matter-removing filter is constituted such that flow rate of exhaust gas through said foreign matter-removing filter is lower at a peripheral edge portion of said foreign matter-removing filter than at a central portion thereof.

4. An exhaust gas purification device according to claim 3, wherein said foreign matter-removing filter is constituted such that a mesh size at the peripheral edge portion thereof is smaller than a mesh size at the central portion thereof.

5. An exhaust gas purification device according to claim 4, wherein said foreign matter-removing filter is constituted such that fine passages at the peripheral edge portion thereof are closed in a predetermined ratio.

6. An exhaust gas purification device according to claim 3, wherein said foreign matter-removing filter is constituted such that fine passages at the peripheral edge portion thereof are closed in a predetermined ratio.

7. An exhaust gas purification device comprising:
   a catalytic converter provided in an exhaust system of an internal combustion engine;
   an electrically heated-type heater disposed upstream of said catalytic converter; and
   a foreign matter-removing filter disposed immediately upstream of a cross-sectional area-increasing region of an exhaust passage containing said electrically heated-type heater,
   said foreign matter-removing filter being constituted such that a mesh size at the peripheral edge portion thereof is smaller than a mesh size at the central portion thereof.

8. An exhaust gas purification device according to claim 7, wherein said foreign matter-removing filter is constituted such that fine passages at the peripheral edge portion thereof are closed in a predetermined ratio.

* * * * *